US009524140B2

(12) United States Patent
Leibow (10) Patent No.: US 9,524,140 B2
(45) Date of Patent: *Dec. 20, 2016

(54) APPARATUS AND SYSTEM FOR MANAGING MULTIPLE COMPUTERS

(71) Applicant: BELKIN INTERNATIONAL, INC., Compton, CA (US)

(72) Inventor: Michael Leibow, Rochester, NY (US)

(73) Assignee: Belkin International, Inc., Playa Vista, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 14/165,124

(22) Filed: Jan. 27, 2014

(65) Prior Publication Data

US 2015/0215570 A1    Jul. 30, 2015

Related U.S. Application Data

(63) Continuation of application No. 11/927,625, filed on Oct. 29, 2007, now Pat. No. 8,639,812, which is a
(Continued)

(51) Int. Cl.
*G06F 15/16* (2006.01)
*G06F 3/14* (2006.01)
(Continued)

(52) U.S. Cl.
CPC .............. *G06F 3/1454* (2013.01); *G06F 3/023* (2013.01); *G06F 3/14* (2013.01); *G09G 5/005* (2013.01);
(Continued)

(58) Field of Classification Search
CPC ........... H04L 67/125; G09G 5/12; G09G 5/14; G06F 3/14; G06F 3/023
See application file for complete search history.

(56) References Cited

U.S. PATENT DOCUMENTS

| 5,594,467 A * | 1/1997 | Marlton | G09G 1/16 |
| | | | 345/213 |
| 6,373,500 B1 * | 4/2002 | Daniels | G06F 3/023 |
| | | | 345/632 |

(Continued)

*Primary Examiner* — Aftab N. Khan
(74) *Attorney, Agent, or Firm* — O'Melveny & Myers LLP (57) ABSTRACT

A system is presented for interconnecting a single user console having user interface devices, including a console keyboard, a console video display unit, a console mouse, and speakers, to a plurality of host computers each capable of using user interface devices, including a keyboard, a video display unit, and a mouse, and allowing the user to access one or more of the host computers from the single user console. The video output from each of the host computers is scaled and cropped as appropriate so that the video output of each host may be simultaneously displayed as host computer "windows" on the console video display unit or overlaid with the background suppressed to display application windows from multiple hosts on a single screen. The user may easily navigate between the host computers through a convenient and intuitive user interface that allows control of individual host computers, the transfer of files between computers using familiar a "drag and drop" interface, and copying and pasting of data between applications running on different computers. The audio output from each of the host computers may be mixed or switched for output to the speakers as desired.

20 Claims, 5 Drawing Sheets

Related U.S. Application Data continuation-in-part of application No. 11/773,381, filed on Jul. 3, 2007, now Pat. No. 7,568,029, which is a continuation of application No. 11/105,063, filed on Apr. 12, 2005, now Pat. No. 7,240,111.

(51) Int. Cl.
  *G06F 3/023* (2006.01)
  *H04L 29/08* (2006.01)
  *G09G 5/00* (2006.01)
  *G09G 5/12* (2006.01)
  *G09G 5/14* (2006.01)

(52) U.S. Cl.
  CPC ............... *G09G 5/12* (2013.01); *H04L 67/125* (2013.01); *G09G 5/14* (2013.01); *G09G 2350/00* (2013.01); *G09G 2360/128* (2013.01); *G09G 2370/24* (2013.01)

(56) References Cited

U.S. PATENT DOCUMENTS

| | | | | |
|---|---|---|---|---|
| 7,721,028 B2 * | 5/2010 | Chien | ................... | G06F 3/023 710/10 |
| 7,911,446 B2 * | 3/2011 | Olsen | ................... | H04L 67/125 345/157 |
| 8,176,226 B2 * | 5/2012 | Hsueh | ................... | G06F 3/023 710/10 |
| 2006/0230110 A1 * | 10/2006 | VanHarlingen | ......... | G06F 3/023 709/205 |
| 2008/0048975 A1 * | 2/2008 | Leibow | ................... | G06F 3/023 345/156 |

\* cited by examiner

APPARATUS AND SYSTEM FOR MANAGING MULTIPLE COMPUTERS

RELATED APPLICATION DATA

This patent application is a continuation of U.S. patent application Ser. No. 11/927,625, filed Oct. 29, 2007, now issued as U.S. Pat. No. 8,639,812 on Jan. 28, 2014, which is continuation-in-part of U.S. patent application Ser. No. 11/773,381, filed Jul. 3, 2007, now issued as U.S. Pat. No. 7,568,029 on Jul. 28, 2009, which is a continuation of U.S. patent application Ser. No. 11/105,063, filed Apr. 12, 2005, now issued as U.S. Pat. No. 7,240,111 on Jul. 3, 2007.

BACKGROUND OF THE INVENTION

1. Field of the Invention

The present invention relates generally to computer systems, and more particularly, to a system to enable a single user console to manage, control, simultaneously view, and share files and data among a plurality of host computers.

2. Description of Related Art

There exist devices for interconnecting a single console or computer to multiple computers. For example, a keyboard/video/mouse (KVM) switch is a device that is generally connected to multiple computers in order to enable a single keyboard, video monitor and mouse to control each of the connected computers. In this way, a user may have access to multiple computers without having to invest in corresponding keyboards, monitors, and mice for each of the computers. When the user accesses a computer connected to the KVM switch, video signals are routed from the computer, processed, and displayed on the single video monitor. Generally, the user must utilize pre-defined key sequences, such as <scroll-lock> <scroll-lock>, to release control over the first computer, return control to the KVM switch, and navigate through an on-screen menu or other display in order to access another computer connected to the KVM switch. In some cases, rather than utilizing key sequences and on-screen menus or displays in order to be able to access another computer, the user must physically actuate a button or other mechanism on the KVM switch. But requiring a user to physically access the KVM switch is adverse to the promotion of easy switching between computers, particularly if the KVM switch is placed in an inconvenient, remote, or inaccessible location, for example.

Regardless of how access to a particular computer is granted, for typical KVM switches, only the video output of the accessed computer is processed and displayed on the single video display unit. That is, a user is not able to view the video output from the other "non-accessed" computers connected to the KVM switch because video output from the "accessed" computer covers the entire video display unit. Allowing a user to view and access one computer while also allowing the user to view the other "non-accessed" computers would not only provide greater information to the user, but would also provide the foundation for enabling quick and seamless navigation and sharing of files and data between all the computers.

There are products available that allow a user to view the video output from multiple sources, such as the QuadView® XL by RGB Spectrum®, but these products do not allow the user to actually access the connected sources. The Quad-View® XL, for example, is generally used for simply displaying multiple images on a monitor or projector without allowing the user to control the sources themselves.

There also exist devices for interconnecting multiple computers such that files may be transferred between storage devices and data may be shared between the processors of multiple computers. However, such devices generally require that a user be familiar with computer networking and file sharing and do not provide a familiar drag-and-drop or copy-and-paste interface that would allow a user to perform such operations in an intuitive fashion with little or no training.

It is desirable, therefore, to provide a system that includes a management device with an intuitive user interface to enable the simultaneous output of video and audio from multiple computers, the seamless and intuitive switching of user control from one computer to another, and familiar drag-and-drop and copy-and-paste interfaces for transferring files and other data between multiple computers connected to the management device.

SUMMARY OF THE INVENTION

The present invention provides an apparatus and system for accessing and sharing data among a plurality of host computers using a single console and allowing a user to simultaneously view a "windowed" display of the video signals from each of the host computers. In one embodiment of the present invention, a management device is operatively connected to a console including a single keyboard, mouse, video display, and speakers, to control and share data among up to four host computers.

The management device of the present invention provides an advanced and intuitive user interface. The video signals from the host computers are processed for display on the video display of the console. Unlike KVM switches, which only allow a user to view the host computer the user is currently accessing, the present invention allows for the simultaneous viewing of all the host computers connected to the management device. The host computers are each displayed in a "window" or frame, which may be moved and/or re-sized on the console video display. The management device is also capable of cropping portions of video displays from each of the hosts in order to suppress the display of certain portions of the windows that may overlap other windows on the console display. Furthermore, the management device can be configured to remove the background of the video display from each host and retain only the windows. In this mode, when the windowed video from each of the host computers is maximized and overlaid on the console screen, the windows from each host are simultaneously visible and appear as if they were all associated with a single computer. To perform this operation, the management device is configured to select, on a per-pixel basis, video data originating from any of the host computers or from the management device video processor, to be displayed on the video console.

Furthermore, the management device of the present invention allows for seamless access to each of the host computers and automatically generates the necessary mouse and keyboard signals to interact with the host computers. The console mouse is represented on the console video display by a console mouse pointer. In order to access a particular host computer, the user simply moves the console mouse pointer over that host computer's window. If the user wishes to access a different host computer, the user may move the console mouse pointer off of the current host computer window and onto the window of the host computer desired to be accessed. If the user does not wish to access any host computer, the user may move the console mouse pointer to the non-windowed area, for example, the desktop area of the console video display. When all host windows are stacked and the backgrounds suppressed, software running on the host computers and management device can be used to interpret mouse movements or mouse clicks in order to activate the host computer associated with the particular window with which the user wishes to work. Because some operating systems and even different applications running under the same operating system may not interpret mouse actions in the same way, particular cases may require the user to enter an extra key stroke or similar action in order to activate the selected host computer. Accordingly, the management device of the present invention will maintain, as nearly as possible, the facade of a windowing interface.

In addition to the mouse pointer provided by the mouse connected to the management device, each of the host computers has its own mouse pointer. Therefore, in order to maintain a seamless windowing interface, the management device of the present invention controls the display of all of the mouse pointers on the console video display. It is preferred that only one mouse pointer, rather than multiple mouse pointers, be visible at any point in time. Accordingly, when none of the host computers is being accessed, the display of the mouse pointer for the host computers may be suppressed and only the console mouse pointer displayed. Similarly, when one of the host computers is being accessed, the mouse pointer for that host computer may be shown, while the console mouse pointer is suppressed and the rest of the host computers' mouse pointers remain suppressed.

When a host computer is accessed (i.e., the console mouse pointer is within the window of the host computer), the management device is able to position the mouse pointer of any accessed host computer exactly under the console mouse pointer by transmitting absolute information regarding the position of the console mouse pointer. At that point, display of the console mouse pointer may be suppressed and display of the mouse pointer of the accessed host computer enabled. The management device can manage the display of the mouse pointers by sending control commands to the host computer. Since one of the most common protocols for controlling a mouse is the PS/2 protocol, which only uses relative information to manipulate the position of the mouse pointer, software drivers may be loaded onto the host computers in order to convert the relative positional information to absolute positional information in order to properly control the display of the host computers' mouse pointers.

The present invention also includes a communications channel interconnecting multiple computers and the management device. This communications channel may be implemented as either a wired or a wireless network. In one embodiment, the communications channel includes Transmission Control Protocol/Internet Protocol (TCP/IP) networking hardware and protocols. In another embodiment, the communications channel includes Universal Serial Bus (USB) hardware and protocols. In still another embodiment, the communications channel includes PS/2 hardware and protocols.

The management device uses the communications channel to enable the intuitive sharing and copying of files between the storage devices of each of the attached computers. When the user drags and drops a file from a window of one host computer to that of another using the console mouse, the management device automatically generates the file transfer commands necessary to copy a file from one computer to another over the communications channel. In addition, the management device allows a user to select and copy text or other data from an application running in the window of one host computer and paste the text or data into an application running on another host computer simply by using the console mouse as if the operation were being performed on a single computer. When a user selects and copies text or graphics from an application running on one host computer, that computer saves that text or graphics in its own "clipboard" memory buffer. Software drivers running on that host computer then transfer the contents of the clipboard memory to the management device via the communications channel. The management device then automatically sends the copied information over the communications channel to each of the other host computers, thereby synchronizing the contents of each computer's clipboard memory. When the user then issues a paste command in any window displayed on the console, the host computer controlling that window pastes the information from its clipboard buffer into the selected application. Alternatively, if the communications channel is relatively slow, the management device can be configured to synchronize the clipboard buffers of the host computers only upon a special action by the user. The user can configure whether or not the clipboard buffers are continually synchronized. Thus, the management device presents the user with a familiar windowing interface, enabling the sharing of files and data between multiple computers with the look and feel of operating a single computer.

The management device of the present invention also manages the audio signals from each of the host computers. In one embodiment, the management device will mix the audio levels from the four host computers, but afford the audio of the currently accessed host computer the highest volume level. In another embodiment, the management device will only allow the audio from the accessed host computer to be sent to the speakers.

An alternative embodiment of the present invention uses a simplified video processor in order to provide most of the functionality of the complete system at a reduced cost to the user. In this embodiment, the simplified video processor in the management device allows the display of video from only one of the host computers at any given time. Small tray icons representing the other attached computers are displayed by the management device on the user console. The user may switch to any other of the attached host computers by clicking on the small tray icon representing that computer. Likewise, a user may transfer files between host computers by dragging a file from the currently selected computer to the small icon representing the selected destination host computer. A user may also copy and paste data from the selected host computer by selecting and copying text from the active computer, clicking on the small icon representing the destination computer, thereby selecting and displaying it, and then pasting the copied information into an application running on the selected destination host computer.

A more complete understanding of the apparatus and system for controlling and simultaneously viewing a plurality of host computers on a single console will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides an apparatus and system that allows for the simultaneous viewing of the video output from a plurality of computers connected to a management device and provides for easy and intuitive access to those connected computers. In the detailed description that follows, like element numerals are used to indicate like elements appearing in one or more of the figures.

Figure 1:
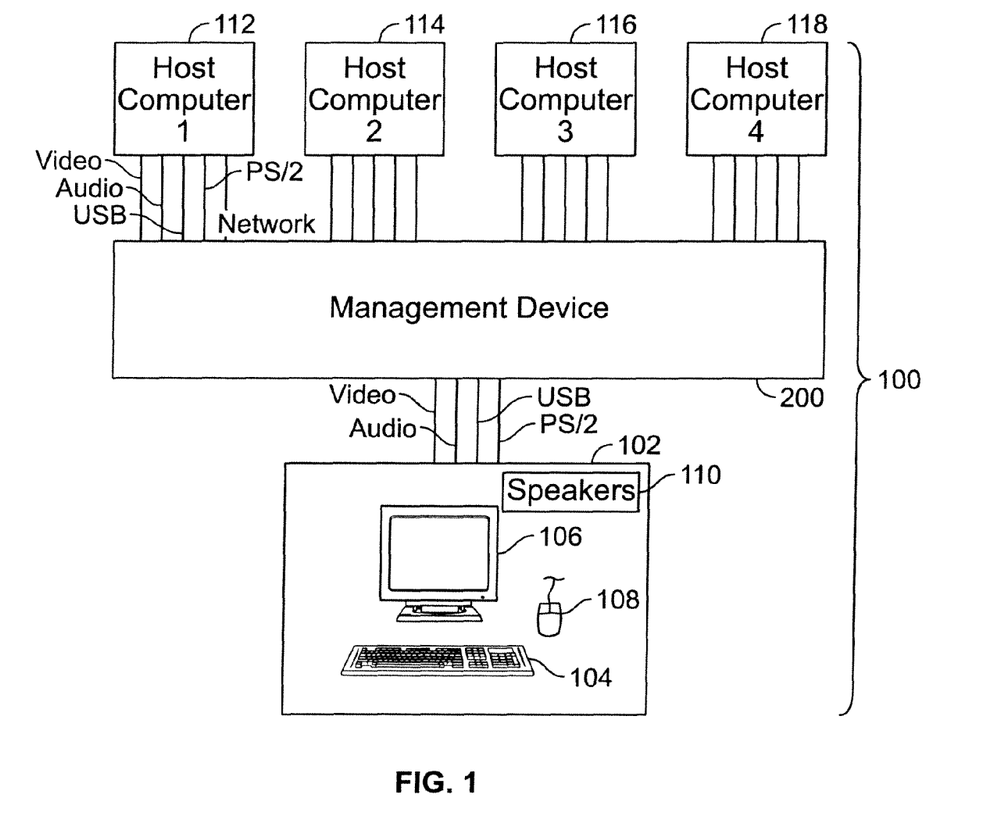
FIG. 1 is a diagram showing an exemplary system for allowing the simultaneous viewing of the video output from a plurality of computers connected to a management device and for providing easy and intuitive user control of each of those computers.

FIG. 1 shows a system for allowing the simultaneous viewing of the video output from a plurality of computers connected to a management device and for providing easy and intuitive access to those computers. In one embodiment of the present invention, system 100 comprises a user console 102 having user interface devices, including a console keyboard 104, a console video display unit 106, a console mouse 108 and console speakers 110, a management device 200, and four host computers 112, 114, 116, and 118. The management device 200 is disposed between the user console 102 and the four host computers 112, 114, 116, and 118. The management device 200 processes signals from the console keyboard 104 and the console mouse 108 for use by the host computers. In addition, the management device 200 processes the video signals from the host computers 112, 114, 116, and 118 such that video signals from each of the host computers may be displayed on the console video display unit 106 simultaneously. Video signals are transmitted through the system 100 primarily in one direction, i.e., from the host computers 112, 114, 116, and 118 to the console 102. Generally, video monitors such as the console video display unit 106 can receive analog video signals (such as those transmitted under the video graphics array (VGA) standard), digital video signals, or both (such as those transmitted under the digital video interface-integrated (DVI-I) standard). Such video monitors may also include a display data channel to communicate monitor information, such as that required under the Video Electronics Standards Association (VESA) DDC2B standard.

As with the video signals, audio signals are also transmitted through the system 100 primarily from the host computers 112, 114, 116, and 118 to the console 102. In one embodiment, the audio signals from each of the host computers 112, 114, 116, and 118 are sent through respective outputs, e.g., audio input/output 140, to an audio controller 184 located in the management device 200. The audio controller 184 controls an audio mixer 186 that is connected to console speakers 110. Each of the audio signals are mixed such that the audio from each of the host computers can be heard, but the audio from the currently accessed host computer, e.g., host computer 112, will have a higher volume than the other host computers, e.g., host computers 114, 116, and 118. In another embodiment, the audio controller 184 may mute or otherwise prevent the audio signals from all the host computers except for the currently accessed host computer from reaching the console speakers 110.

Figure 2:
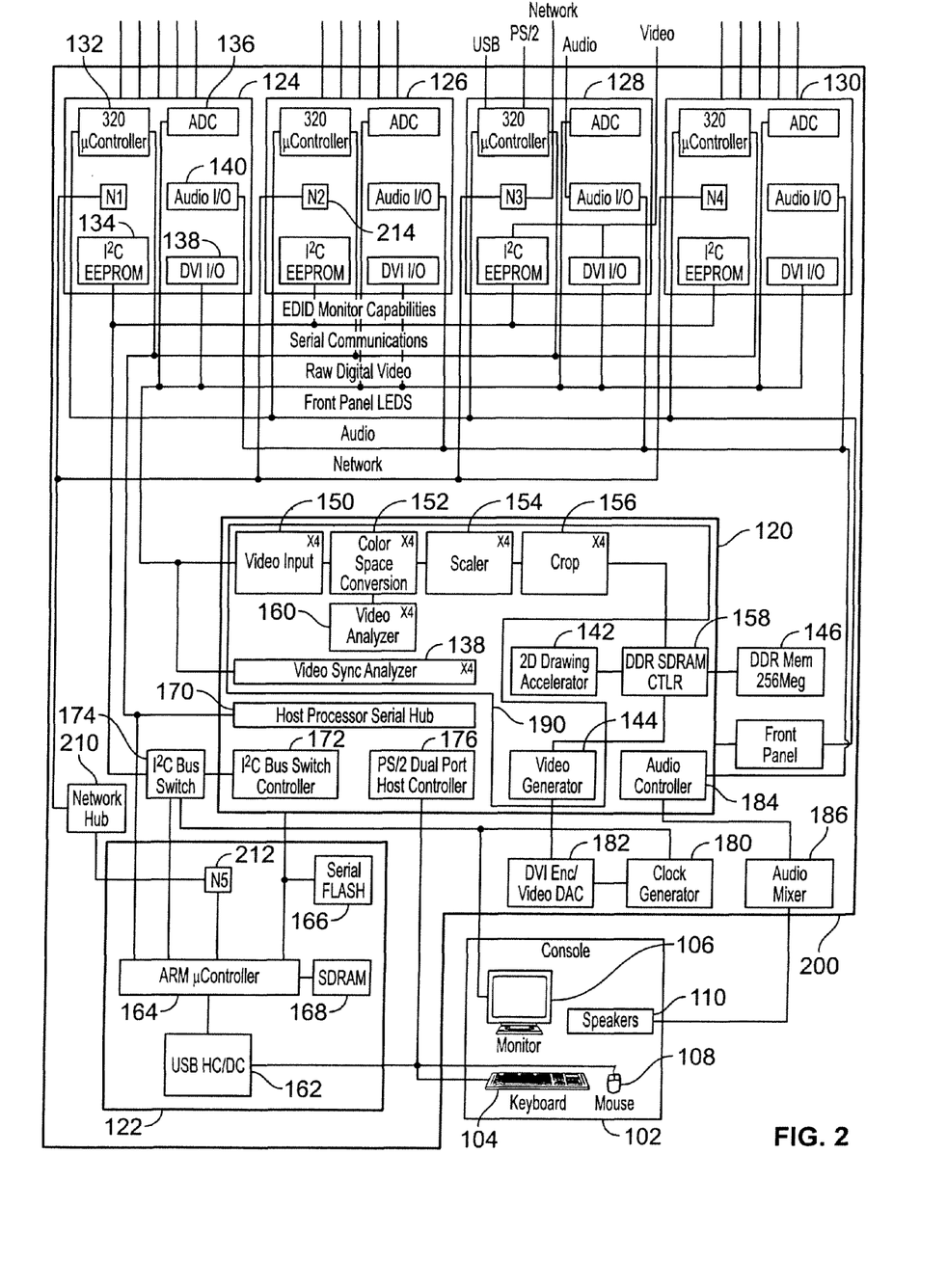
FIG. 2 is a diagram showing an exemplary management device according to the invention.

FIG. 2 is a diagram showing an exemplary management device 200 according to an embodiment of the invention. Management device 200 comprises an integrated circuit 120, a console processing unit 122, and host processing modules 124, 126, 128, and 130. The host processing modules 124, 126, 128, and 130 provide the interface between the host computers 112, 114, 116, and 118, respectively and the management device 200. The number of host processing modules may vary depending on the number of host computers that can be allowed to connect to a particular management device. For example, there may be a one-to-one correspondence between host processing modules and host computers. On the other hand, it may be possible for a host processing module to be multiplexed to multiple host computers. Furthermore, an additional management device may be disposed between a plurality of host computers and at least one host processing module to thereby increase the total number of host computers that may be managed.

In one embodiment of the present invention, the host processing modules, e.g. 124, each comprise a host microcontroller 132 and an erasable programmable read-only memory (EEPROM) 134 (e.g., the Philips Semiconductor Inter-IC ($I^2C$) EEPROM). It is generally desirable for the host processing module to be able to handle both analog and digital video signals. Therefore, in an embodiment of the present invention, the host processing modules, e.g. 124, may further include an analog-to-digital converter (ADC) 136 (such as the Xicor X98017 ADC), as well as a digital video input/output 138. When only analog video signals or only digital video signals are generated by the host computers, e.g. 102, the host processing modules, e.g. 124, will automatically process whichever video signal is present. If both analog and digital video signals are present, the host processing module may be programmed to choose one signal over the other, or may simply select by default either the analog or digital video signals.

File data and application data are also transmitted through the system 100 from one host computer 112, 114, 116, or 118 to another and through the management device 200 using a communications channel. In the preferred embodiment, the communications channel comprises a TCP/IP network connecting the management device 200 with each host computer 112, 114, 116, and 118; USB connections between the management device and each computer; PS/2 connections between the management device and each computer; TCP/IP network connections internal to the management device 200 connecting network nodes, e.g., 214, 212, and a network hub 210; and an internal serial bus, which may communicate using $I^2C$, SRI, USB, PS/2, RS-422, and other serial protocols, internal to the management device 200, connecting a serial hub 170 to the host processing units 124, 126, 128, and 130, to the integrated circuit 120, and to the console processing unit 122. The TCP/IP network may be wired or wireless. To save costs, an implementation of this invention may exclude the TCP/IP network and associated hardware and accept a penalty of slower data transfer speeds over a USB, PS/2, or other serial bus.

To transfer a file from one of the host computers to another, a user may select a file appearing in a host window on the console using the console mouse, and drag it over to another host window. The management device microcontroller 164 will then generate the proper network file transfer commands and send them via the host processing module, e.g. 124, to copy the selected file to its selected destination over the TCP/IP, USB, PS/2, or other communications channel, thus preserving the look and feel of a windows interface to a single computer.

Similarly, the user may copy and paste information from an application running on one host computer, e.g. 112, to an application running on another host computer, e.g. 114, using the communications channel. When the user selects text or graphics from one window and executes a copy command, e.g., <CTRL>-C, the host computer controlling the selected window copies the text or graphics to its own "clipboard" memory buffer. Software drivers running on the host computer, e.g. 112, then send the copied data to the management device 200. The management device microcontroller 164 then issues commands over the communications channel to all of the host computers, placing the copied data into the respective clipboard buffers of each host computer, thereby maintaining synchronization of all of the host computers' clipboard buffers. When a user moves the console cursor to another window, the host computer associated with that window is activated, and a subsequent paste command initiated by the user will paste the data stored in that host computer's clipboard buffer into the application running in the selected host window. Alternatively, if the communications channel is relatively slow, e.g., utilizing a PS/2 protocol, the user can configure the management device to prevent continuous synchronization of the clipboard buffers. In that case, the microcontroller 164 will intercept the user paste command, send the copied data to the selected host computer over the communications channel, and then pass the paste command to the selected host computer to effect the pasting of the copied data into the selected application. Thus, the look and feel of a single-computer, windows-based cut-and-paste operation will be preserved.

The integrated circuit (such as a field programmable gate array (FPGA) or other programmable logic device) 120 is responsible for analyzing and processing the video signals from each of the host computers, e.g., host computer 112. It is conceivable that an application-specific integrated circuit (ASIC) may be utilized, but ASICs generally require a large up-front cost that could outweigh the benefit of a reduced recurring production cost. The integrated circuit 120 comprises a two-dimensional drawing accelerator 142, an intermediate frame buffer controller 158, a host processor serial multiplexer 170, a PS/2 dual port host controller 176, a video processing unit 190, and an audio controller 184.

The integrated circuit 120 is also utilized to control the flow of data between the host computers and the user console 102. An I$^2$C bus switch 174 is connected between the host computers' I$^2$C EEPROM (e.g. 134), and a microcontroller 164 (such as those designed by ARM Limited) within the console processing unit 122, in order to initiate and terminate data transfers from the host computer to the console 102. The integrated circuit 120 further comprises a I$^2$C bus switch controller 172 (such as those designed by Philips Semiconductor), which controls the I$^2$C bus switch 174 or other high-speed connection to allow the microcontroller 164 to communicate with I$^2$C devices in the host computers. The microcontroller 164 in the console processing unit 122 manages the PS/2 and USB bus traffic from the console user interface devices 104 and 108, presenting data onto the internal I$^2$C bus and routing it appropriately to the host processing units 124, 126, 128, and 130, which communicate with the host computers.

The video processing unit 190 comprises a video input 150, a color-space conversion module 152, a scaling module 154, a cropping module 156, a video analyzer 160, a video sync analyzer 138, and a video generator 144. The video analyzer 160 analyzes the video stream in order to determine the boundary of the active video region of the digital video signals. Furthermore, the video analyzer 160 may attempt to improve the images captured by adjusting the parameters of the ADCs, e.g. 136, in the host processing modules. In addition to digital video signals, the host computers also transmit video synchronization signals to the video synchronization analyzer 138. The video synchronization analyzer 138 analyzes the video synchronization signals to determine the resolution and location of the active video region of the digital video signal.

Once the active video region of the digitized video signal is determined, the digital video signal is scaled and cropped as appropriate by the scaling module 154 and the cropping module 156, respectively, the intermediate frame buffer controller 158 stores it in a frame buffer, such as a double-data-rate-synchronous-dynamic-random-access memory (DDR-SDRAM) 146. In the case of four host computers, there is a video input 150, color-space conversion module 152, scaling module 154, cropping module 156, video analyzer 160, and video sync analyzer 138 corresponding to each of the host computers.

The frame buffer 146 or some other intermediate storage is required because the host computers are asynchronously providing video signals to the integrated circuit 120 at different frequencies and phases. The video card of each host computer is completely separate and isolated from the video cards of other host computers. Therefore, although each host computer may be producing the same video resolution, the time domain of each output will be different from each other. Similarly, the video output clock rate of the management device 200 may also be running at a different time domain from the host computers as a result of its own internal clock generator 180. But this is not necessarily the case, for example, where the management device video output utilizes signals from one of the inputted host computers in order to match time domains. Nevertheless, because at least three of the video signals from the host computers will be out of synchronization with the management device video output, a video frame may need to be skipped or added for each host computer at a recurring point in time. That is, if a host computer video signal input is slower than the management device video output, a frame may need to be added since the data will not otherwise be available. Conversely, if a host computer video signal input is faster than the management device video output, a frame may need to be skipped. The video processing unit 190 of the present invention is capable of performing these time-domain manipulations, including the adding or dropping of frames from the frame buffer. In addition, the video processor 190 performs standard drawing manipulations and two- and three-dimensional raster manipulations of input video from the host computers and output video to the user console. For example, the video processor can draw and fill pixels, lines, curves, polygons, and text, and it can perform rotations, shearing, translations, rotations, scaling, and other common manipulations of video data.

After the important, i.e., non-background, frame portions of input host video are recorded, they are stored in the frame buffer 146 along with a screen representation drawn by the two-dimensional drawing accelerator 142. A composite image is digitally formed by a video generator 144 and optionally converted to analog via a digital-to-analog converter 182 before being transmitted to the console video display unit 106 and displayed as a "host computer window."

Figure 3:
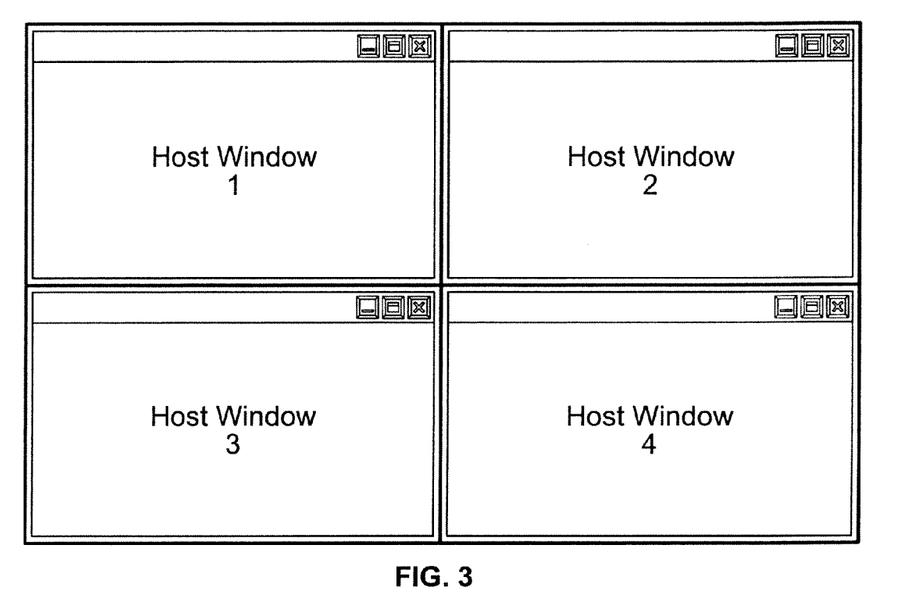
FIG. 3 is a diagram showing an exemplary layout of non-overlapping host display on the console display unit.

FIG. 3 shows an exemplary arrangement whereby each of the host computer displays is visible on the console video display unit 106. The size and position of each of the host computer displays, visible on the console video display unit 106, may be manipulated by the user.

The digital video signals transmitted from the host processing units to the integrated circuit 120 consume a large amount of bandwidth. For example, if each host processing unit transmits a video signal with a screen resolution of 1600×1200 with a refresh rate of 60 Hz and in 24-bit color, the frame buffer 146 would be required to handle nearly 2 GB of data per second. In order to reduce cost, however, it is preferable to reduce the amount of total video bandwidth. This may be achieved by utilizing the color-space conversion module 152, the scaling module 154, and the cropping module 156.

Generally, a digital video signal is formed using red-green-blue (RGB) colors in an orthogonal color space. This color space has an axis representing luminance (light intensity), while the two other axes represent chrominance (difference between one color and a reference color of the same brightness and quality of a color). It is well known that the human eye can perceive the luminance of an image much better than chrominance. Therefore, the chrominance may be bandwidth reduced in an image without significant degradation to the perceived image quality. Accordingly, the color-space conversion module 152, in conjunction with the video analyzer 160, can reduce the video data from 24-bit color to 16-bit color, for example. For the video signal with a pixel resolution of 1600×1200 and refresh rate of 60 Hz, this reduction alone would decrease the bandwidth that the frame buffer 146 would be required to handle to about 1.3 GB/s.

Figure 4:
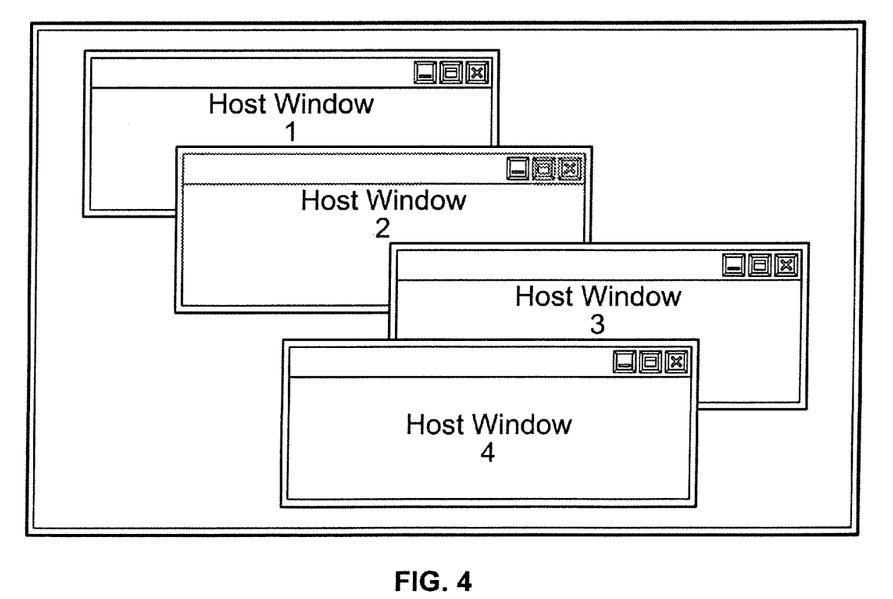
FIG. 4 is a diagram showing an exemplary layout of partially cascaded, overlapping host displays on the console display unit.

The bandwidth that the frame buffer 146 is required to handle is further reduced via the scaling module 154 and the cropping module 156. The scaling module 154 proportionally reduces the size of the host computer windows so that more than one host computer window may be visible at a given time. These scaled windows may be made larger or smaller according to the preference of the user. The cropping module 156 removes portions of the host computer windows that cannot be seen due to any overlapping between windows. In FIG. 4, for example, host computer window 4 is fully visible while the host computer windows 1 through 3 are each at least partially obscured. The cropping module 156 removes the data corresponding to the sections that cannot be seen. In this way, the bandwidth required to be handled by the frame buffer 146 is reduced by three-fourths; thus, for a video signal with a pixel resolution of 1600×1200 and frequency of 60 Hz, for example, the bandwidth could be reduced to approximately 325 MB/s. This is because the total amount of visible space on the console video display unit 106 will never exceed one screen's worth of data. In other words, if the entire visible space of the console video display unit 106 were covered, for example, by a single host window, all the data from the other three host windows would be removed because those windows cannot be seen. Accordingly, the bandwidth required would be one-fourth of the total bandwidth.

It should be noted that rather than having the color-space conversion module 152 in the integrated circuit 120, a similar function could be performed within the ADC 136 in the host processing module. For example, an ADC such as the Analog Devices AD9880 is capable of performing this function.

In addition to reducing the bandwidth as described above, the total incoming video bandwidth may be reduced by removing one or more frames from the video stream. That is, the color-space conversion module 152, video analyzer 160, scaling module 154, and cropping module 156, may all be temporarily or periodically disabled under software control in order to skip incoming frames. This may be desirable in situations such as if the available video bandwidth is temporarily exceeded when the frame buffer is used for another purpose in addition to storing the four input video frames and producing one video output frame. For example, additional bandwidth may be needed if the user has moved a host window and the two-dimensional drawing accelerator 142 is used to redraw a frame stored in the frame buffer 146 in order to flood-fill a space in the frame. The periodic skipping of incoming frames is done in such a way that the user is minimally (if at all) visually aware that any frames have been skipped.

Figure 5:
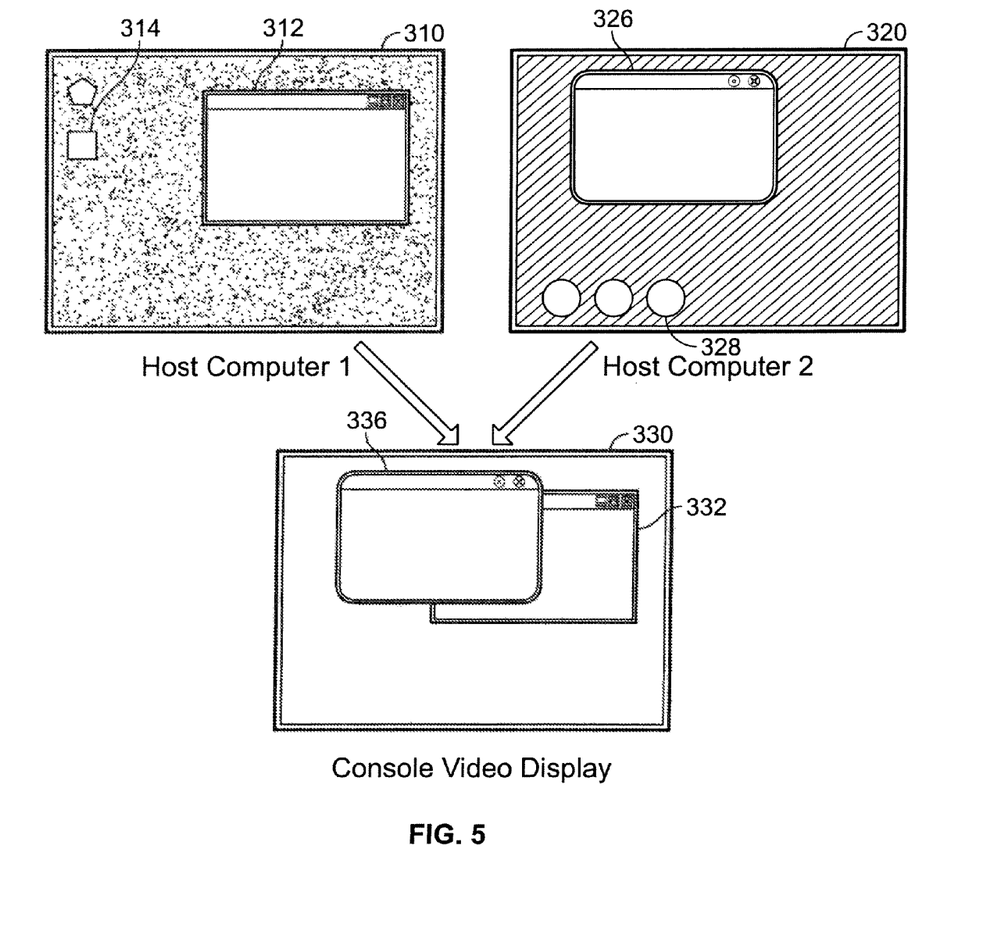
FIG. 5 is a diagram showing an exemplary layout of stacked host windows from which the background has been suppressed by the management device.

The video processing module 190 may also operate to remove the background display data from the video streams received from each of the host computers, leaving only the "foreground" window display data. If each of the host windows is then resized to take up the entire console display using the scaling module 154, all of the host windows will overlay one another, and the user will be able to "see through" the removed background to view the windows of the other host computers that are stacked underneath. The display will thus appear to be that of a single computer, merging windows associated with different host computers. In one embodiment, the video processing unit 190 contains a cropping module 156 that is used to remove portions of video data from input video streams received from the host computers such that video data corresponding to background information is not stored in the video frame buffer 146. In another embodiment, the cropping module 156 removes background video data from an output video stream read out of the frame buffer 146 and destined for the console video display 106. In this second embodiment, the cropping module operates to remove a portion of the video data stored in the frame buffer to prevent its display on the video console. FIG. 5 depicts an exemplary display of such a merged desktop. The video output of one host computer 310 consists of a window 312 and icons 314, as well as other background video data. The video output of a second host computer 320 also consists of a window 326 and icons 328 and other background data. The management device removes the background from each video output and generates a merged display 330 in which windows 332 and 336 associated with the two host computers, are visible. When the management device is presenting such a merged desktop display to the user, keystroke data and mouse data must be sent to all of the host computers simultaneously. Software drivers running on the individual host computers filter the communication data to process only the data that is relevant to that host. For example, most keystrokes would be ignored by all of the hosts except for the one controlling the currently active window on the user console display. The software drivers on the non-selected host computers keep track of which window on which host is active and ignore keystrokes directed to the active window. In order to display all its windows as inactive to a user, software running on an unselected host may create dummy windows that are not displayed to the user and grant them focus in order to remove focus from all other windows displayed by that host.

Some keystrokes will be processed by each host computer regardless of whether that host computer is controlling the active window. For example, certain mode keys such as <CTRL> or <ALT>, when held depressed, may cause the mouse pointer to be displayed in a different manner as it passes over a non-active window. Thus, the software running on the hosts must allow such keystrokes to pass through the filter to be processed by the host. Furthermore, certain applications running on a host computer may use the mouse for a purpose other than displaying a cursor. For example, a mouse may be used to rotate a CAD object in a design application, or it may be used to navigate through a three-dimensional first-person video game. In such cases, keystrokes may be required to grant one host computer exclusive control over the mouse and then to return that control again to the management device. Thus, all keyboard and mouse commands must be sent simultaneously to all hosts, and software drivers on the host computers are needed to filter and retain only that data relevant to that host computer. A standard KVM switch, by contrast, multiplexes the user input devices to only one host at a time, and would thus not support the merged desktop mode described herein.

Data from the console keyboard 104 and console mouse 108 is transmitted through the system 100 primarily in the opposite direction from the video signals, i.e., from the console 102 to the host computers 112, 114, 116, and 118. Data from the console keyboard and console mouse can be either in Universal Serial Bus (USB) or PS/2 format.

The user console 102 is operatively connected to the console processing unit 122, which comprises a USB 2.0 Host Controller and Device Controller (USB HC/DC) 162, a microcontroller 164, a serial FLASH memory 166, and an SDRAM 168. If the data from the user console 102 is in PS/2 format, the data is transmitted as a serial bitstream to a PS/2 dual port host controller 176 in the integrated circuit 120. The PS/2 dual port host controller 176 prepares the data, for example, by removing the handshaking information and parity from the bitstream, prior to processing by the microcontroller 164. The microcontroller 164 then converts the data from the PS/2 dual port host controller 176 into data packets (internal serial format), which are transmitted through a host processor serial hub 170 in the integrated circuit 120 to all of the host microcontrollers, e.g., 132. The host microcontrollers, e.g., 132, may then convert the mouse and keyboard information (such as "key up" or "key down" commands) from the internal serial format back into the PS/2 format and will then transmit this data to all of the host computers. As described above, software running on the host computers will determine which particular keystrokes or mouse commands to listen to.

The handling of data is similar when the data from the user console 102 is in USB format, with the primary exception that the data is first handled by the USB HC/DC 162 in the console processing unit 122 (rather than the PS/2 dual port host controller 176) before being processing by the microcontroller 164. It is desirable, but not always necessary, for the data type to be kept the same from the user console 102 to the host computer. For example, if a PS/2 mouse is used at the user console 102, and both a PS/2 and USB cable are connected to the host computer, the PS/2 connection will be preferred. Similarly, if a USB mouse were used, then the USB connection would be preferred. Accordingly, it is preferable that the internal serial format include an identification of the original format of the data.

By converting the format of the data sent from the console 102 into internal serial format (rather than sending the original PS/2 or USB data), greater efficiencies in speed, cost, and compatibility are achieved. For example, the present invention takes advantage of the fact that almost all microcontrollers have a universal asynchronous receiver/transmitter (UART) to handle serial data, while microcontrollers rarely have PS/2 hardware. In addition, UARTs handle the serial data very quickly, and require fewer input/output ports and resources than PS/2 hardware.

The host microcontrollers may simulate input/output devices to facilitate system software when actual devices are not attached to the management device 200. For example, the host microcontroller 132 may simulate a keyboard and a mouse when no actual keyboard or mouse is attached to the management device 200. This is particularly useful because the host computers may not boot properly unless a keyboard and/or mouse is connected to the management device 200 and may generate errors if the keyboard and/or mouse is removed from the management device 200 during normal operation. In addition, dozens of signal groups, device drivers, systems states, and real-time events are handled by the host microcontroller 132. For example, as explained below, the host microcontroller 132 may require a software driver to handle the special display considerations when there is a console mouse pointer and up to four additional host computer mouse pointers.

The position of the console mouse 108 is represented on the console video display unit 106 by a console mouse pointer. In addition, each of the host computers will also have a corresponding host mouse pointer. When all four of the host computers are connected to the management device 200, it is preferred that only one mouse pointer, rather than five mouse pointers, be visible at any given time. Therefore, in a preferred embodiment of the present invention, the four host mouse pointers and the console mouse pointer will appear as one mouse pointer on the console video display unit 106.

A standard PS/2 or USB mouse transmits information causing the mouse pointer to move a certain number of counts up, down, left, or right from the mouse pointer's current position. Once a host computer's active region is displayed as a window on the console video display unit 106, it is preferable that the host mouse pointer track the console mouse pointer when the console mouse pointer is within the host computer's active region. Therefore, the management device 200 needs to know the position of the console mouse pointer with respect to the host computer window. Since a standard mouse typically transmits only relative positional information, the management device 200 positions the host mouse pointer exactly under the console mouse pointer by converting the relative positional information of the console mouse pointer into absolute positional information using driver software loaded on the host computer. The procedure for converting a mouse's relative positional information into absolute positional information is well known to a person skilled in the art of windowing systems.

Alternatively, it would be possible to find the location of the console mouse pointer with respect to the host computer window by analyzing the video stream, but this may require the management device 200 to perform image recognition. Among the many difficulties, including the need for substantial processing power, it may also require that the management device 200 maintain software compatibility regardless of the operating system and program running on the host computers. Accordingly, this option is less desirable.

In one embodiment of the present invention, the position of the mouse pointer with respect to the host displays may be used to control how the cursor is displayed on the user console display, though other techniques may be used. When the console mouse pointer is within the boundary of a host display, the management device 200 may remove, or turn off, the console mouse pointer, and the host mouse pointer may be turned on. Conversely, when the console mouse pointer is moved outside the boundary of a host display, the host mouse pointer may be turned off and the console mouse pointer turned on. This may be accomplished by sending control data or commands, in addition to the normal keyboard and mouse data, to the microcontroller of the host computer being accessed. For example, the console may send additional data to the host microcontroller, e.g., microcontroller 132, such as commands to switch to relative mouse addressing, switch to absolute addressing, hide host mouse pointer, and show host mouse pointer. Accordingly, an appearance of seamless mouse operation between the host window and the console desktop may be achieved. In addition, certain applications may utilize the mouse pointer to perform tasks other than to display a cursor. For example, a three-dimensional video game may use the mouse to orient and move a character. In such a case, pre-defined key strokes may be required to lock focus on the host running such an application. Likewise, key strokes may be required to then return control to the management device or to another host computer. For example, to return control from a host computer to the management device 200, a key sequence, such as <control> <control> can be used to remove "focus," or control, from the host computer and return control to the management device 200. The key sequence to accomplish this is entirely arbitrary, and may be programmable. Generally, the key sequence should be one that is rarely, if ever, used during normal computer operation. Notably, however, such a key sequence is normally not necessary when switching between two host computers. Nevertheless, the invention provides for this type of ancillary information to be sent to all of the host computers in addition to the mouse movement data.

When host displays overlap on the user console, and in particular, when all host displays are overlaid with background video suppressed, the position of the cursor by itself may not be sufficient to select the host computer to which the user is given access. Thus, when displays from different hosts overlap, keyboard and mouse commands will be continually communicated to all host computers, and software drivers running on the host computers will filter the data to determine which commands are relevant to that host.

Figure 6:
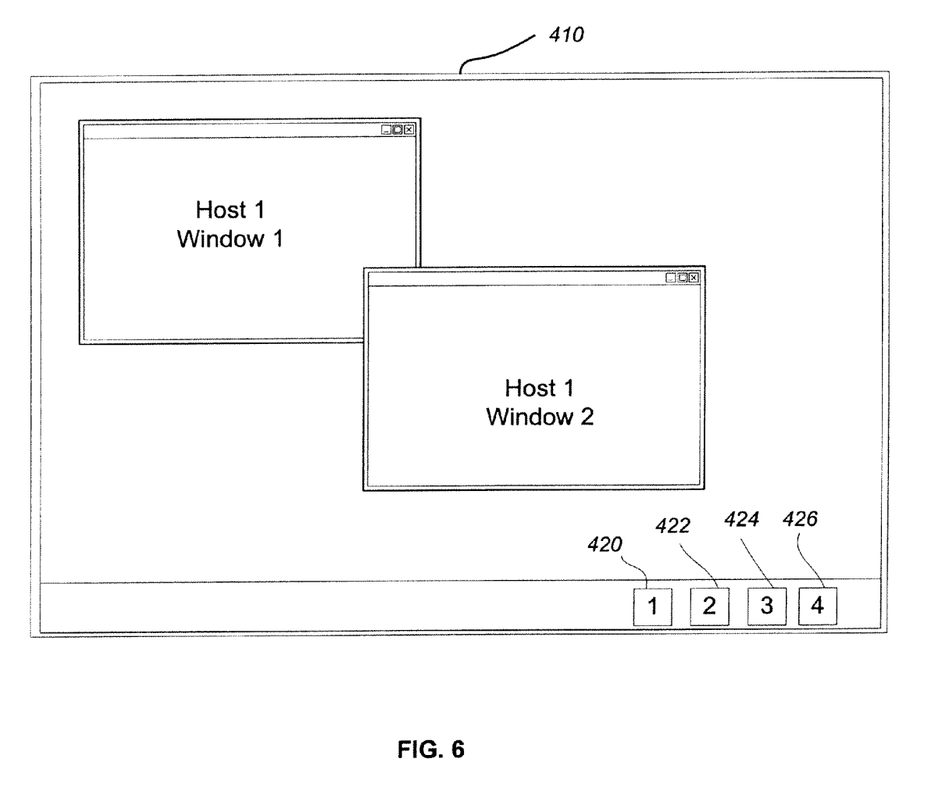
FIG. 6 is a diagram showing an exemplary console display of an alternative embodiment of this invention that displays video from only one host computer and allows switching to other computers using small tray icons that appear on the console display.

Another embodiment of the invention comprises a simplified management device, which is equivalent to the management device depicted in FIG. 2, but with the video processor 190 significantly simplified. This simplified embodiment provides all of the networking and file and data transfer capabilities of the invention but eliminates many of the advanced video processing capabilities in order to provide the consumer with a system at a lower cost. The console video display in this simplified implementation is multiplexed between the attached host computers, such that the video from only one computer is displayed on the host console at any given time. However, the communications channel interconnects all of the computers and enables keyboard and mouse data to be sent to all of the host computers simultaneously. Software drivers on the host computers filter the mouse and keyboard data to process only the information relevant to that host computer. Thus the management device is not required to perform significant video processing, thereby reducing the complexity and cost of the invention for users that do not require this functionality. Instead, the management device will generate and display a small video overlay, such as a tray icon, that will represent the host computers currently attached to the management device. FIG. 6 provides an example console display 410 that includes small icons 420, 422, 424, and 426 that represent host computers 1, 2, 3, and 4, attached to the management device. A user may click on one of the small icons in order to switch control of the video display over to the corresponding host computer. When the user wishes to copy a file from the active selected computer, the console pointer can be used to drag the file onto the small tray icon representing the host computer that is desired to receive the copied file. Similarly, a user may copy text or graphics from one application by using the console pointer device to select and copy the information of interest, then clicking on the small icon representing the selected destination host computer to display video from that computer, and then pasting the information into the selected application running on the selected host computer.

Having thus described embodiments of an apparatus and system that allows for the simultaneous viewing of the video output from a plurality of computers connected to a console device and provides for easy access to and sharing of data between those connected computers, it should be apparent to those skilled in the art that certain advantages of the invention have been achieved. It should also be appreciated that various modifications, adaptations, and alternative embodiments thereof may be made within the scope and spirit of the present invention. The invention is further defined by the following claims.

What is claimed is:

1. A computer management system comprising:
a plurality of host computers;
a user console having associated user interface devices including a keyboard, a cursor control device, and a video display unit; wherein the video display unit displays visual representations of video signals from at least two of the plurality of host computers, each representation having a boundary defining a window; and
a management device operatively connecting the user console to the plurality of host computers, wherein the management device manages keyboard control signals and cursor control signals transmitted from the user console for providing access to any one of the plurality of host computers, and manages the video signals transmitted from each of the plurality of host computers for simultaneously displaying video signals from at least two of the plurality of host computers in at least first and second windows on the video display unit;
wherein the management device automatically activates a first one of the plurality of host computers after a user console pointer icon that is visually represented on the video display unit (a) is moved within the boundary of the first window and (b) interacts with the first window, said activation allowing access by the user console to said first one of the plurality of host computers;
wherein said first window is one of equal to or smaller than said second window and said interaction with said first window results in the activation of said first one of said plurality of host computers while maintaining a size and a location of said first window on said video display unit;
wherein the management device is configured to communicate location information of said user console pointer icon and a show-mouse-pointer command to said first one of said plurality of host computers when said first window is activated, at least said location information being communication so that only one pointer icon out of the user console pointer icon and the plurality of pointer icons associated with the plurality of host computers is visible on said video display unit at one time;

wherein at least said location information is used to position said pointer icon of said first one of said plurality of host computers behind said user console pointer icon, thereby making only one pointer icon visible on the video display unit at one time.

2. The computer management system of claim 1, wherein said interaction with said first window comprises at least one click of said user console pointer icon on said first window.

3. The computer management system of claim 1, further comprising a video processing unit configured to resize at least one visual representation of said video signals received from at least one of the plurality of host computers to a size up to and including 100 percent of a full size of the video display unit.

4. The computer management system of claim 1, further comprising a video processing unit configured to reposition points of origin of the video signals received from the at least two of the plurality of host computers for display on the video display unit, including those positions at which the visual representations of video signals from the at least two of the plurality of host computers overlap.

5. The computer management system of claim 1, wherein the management device further comprises at least one scaling module adapted to selectively alter scale of at least one visual representation of the video signals received form at least one of the plurality of host computers.

6. The computer management system of claim 1, wherein the management device further comprises at least one cropping module adapted to selectively crop at least one of the first and second windows.

7. The computer management system of claim 1, wherein the management device operatively connects the user console to the plurality of host computers via a communications channel, and software operates to provide automatic generation of commands to transfer data from the first one of the plurality of host computers to a second one of the plurality of host computers by monitoring a first memory buffer of the first one of the plurality of host computers, and upon detecting the data being added to the first memory buffer, copying the data to a second memory buffer of the second one of the plurality of host computers.

8. The computer management system of claim 1, wherein the user console further comprises speakers operatively connected to the plurality of host computers via the management device, wherein audio signals from the plurality of host computers are mixed together prior to being output to the speakers.

9. The computer management system of claim 1, wherein the user console further comprises speakers operatively connected to the plurality of host computers via the management device, wherein audio signals from deactivated ones of the plurality of host computers are muted.

10. A computer management system comprising:
a plurality of host computers;
a user console having associated user interface devices including a keyboard, a cursor control device, and a video display unit; wherein the video display unit displays visual representations of video signals from at least two of the plurality of host computers, each representation having a boundary defining a window; and a management device operatively connecting the user console to the plurality of host computers, wherein the management device manages keyboard control signals and cursor control signals transmitted from the user console for providing access to any one of the plurality of host computers, and manages the video signals transmitted from each of the plurality of host computers for simultaneously displaying video signals from at least two of the plurality of host computers in at least first and second windows on the video display unit;

wherein the management device automatically activates a first one of the plurality of host computers after a user console pointer icon that is visually represented on the video display unit (a) is moved within the boundary of the first window and (b) interacts with the first window, said activation allowing access by the user console to said first one of the plurality of host computers;

wherein said first window is one of equal to or smaller than said second window and said interaction with said first window results in the activation of said first one of said plurality of host computers while maintaining a size and a location of said first window on said video display unit;

wherein the management device is configured to communicate location information of said user console pointer icon and a show-mouse-pointer command to said first one of said plurality of host computers when said first window is activated, at least said location information being communication so that only one pointer icon out of the user console pointer icon and the plurality of pointer icons associated with the plurality of host computers is visible on said video display unit at one time;

wherein said location information is used to position said pointer icon of said first one of said plurality of host computers at a location of said user console pointer icon on said video display unit, said management device being further configured to hide said user console pointer icon after said pointer icon of said first one of said plurality of host computers is shown, thereby making only one pointer icon visible on the video display unit at one time.

11. The computer management system of claim 10, wherein the management device is further configured to communicate a hide-mouse-pointer command to said first one of said plurality of host computers when said user console pointer icon is moved outside said boundary of said first window when said first one of said plurality of host computers is activated.

12. A method of operatively connecting a user console to a plurality of host computers via a management device, the user console having associated user interface devices including a keyboard, a cursor control device, and a video display unit, wherein the video display unit displays visual representations of video signals from at least two of the plurality of host computers, each representation having a boundary defining a window; and wherein the management device manages keyboard control signals and cursor control signals transmitted from the user console for providing access to any one of the plurality of host computers, and manages the video signals transmitted from each of the plurality of host computer for simultaneously displaying video signals from at least two of the plurality of host computers in at least first and second windows on the video display unit, comprising:

automatically activating a first one of the plurality of host computers in response to a user console pointer icon that is visually represented on the video display unit (i)

being moved within the boundary of the first window and (ii) interacting with the first window, said activation allowing access by the user console to said first one of the plurality of host computers, said first window being one of equal to or smaller than said second window and said interaction with said first window resulting in the activation of said first one of said plurality of host computers while maintaining a size and a location of said first window on said video display unit; and communicating location information of said user console pointer icon and a show-mouse-pointer command to said first one of said plurality of host computers when said first window is activated, at least said location information being communication so that only one pointer icon out of the user console pointer icon and the plurality of pointer icons associated with the plurality of host computers is visible on said video display unit at one time; and using said location information to position said pointer icon of said first one of said plurality of host computers behind said user console pointer icon, thereby making only one pointer icon visible on the video display unit at one time.

13. The method of claim 12, wherein said step of interacting with said first window further comprises using said user console pointer icon to double click on said first window.

14. The method of claim 12, further comprising the step of resizing the visual representation of video signals received from at least one of the plurality of host computers to a size up and including 100 percent of a full size of the video display unit.

15. The method of claim 12, further comprising the step of repositioning points of origin of the video signal received from the at least two of the plurality of host computers for display on the video signals from the at least two of the plurality of host computers overlap.

16. The method of claim 12, further comprising the step of generating commands to transfer data from the first one of the plurality of host computers to a second one of the plurality of host computers by monitoring a first memory buffer of the first one of the plurality of host computers, and upon detecting the data being added to the first memory buffer, copying the data to a second memory buffer of the second one of the plurality of host computers.

17. The method of claim 12, further comprising the steps of:

outputting an audio signal to at least one speaker; and
generating said audio signal by mixing together audio signals from the at least two of the plurality of host computers before outputting said audio signal to said at least one speaker.

18. The method of claim 12, further comprising the steps of:

outputting an audio signal to at least one speaker; and
muting audio signals from deactivated ones of the plurality of host computers before outputting said audio signal to said at least one speaker.

19. A method of operatively connecting a user console to a plurality of host computers via a management device, the user console having associated user interface devices including a keyboard, a cursor control device, and a video display unit, wherein the video display unit displays visual representations of video signals from at least two of the plurality of host computers, each representation having a boundary defining a window; and wherein the management device manages keyboard control signals and cursor control signals transmitted from the user console for providing access to any one of the plurality of host computers, and manages the video signals transmitted from each of the plurality of host computer for simultaneously displaying video signals from at least two of the plurality of host computers in at least first and second windows on the video display unit, comprising:

automatically activating a first one of the plurality of host computers in response to a user console pointer icon that is visually represented on the video display unit (i) being moved within the boundary of the first window and (ii) interacting with the first window, said activation allowing access by the user console to said first one of the plurality of host computers, said first window being one of equal to or smaller than said second window and said interaction with said first window resulting in the activation of said first one of said plurality of host computers while maintaining a size and a location of said first window on said video display unit;

communicating location information of said user console pointer icon and a show-mouse-pointer command to said first one of said plurality of host computers when said first window is activated, at least said location information being communication so that only one pointer icon out of the user console pointer icon and the plurality of pointer icons associated with the plurality of host computers is visible on said video display unit at one time; and using said location information to position said pointer icon of said first one of said plurality of host computers at a location of said user console pointer icon; and hiding said user console pointer icon after said pointer icon of said first one of said plurality of host computers is shown, thereby making only one pointer icon visible on the video display unit at one time.

20. The method of claim 19, wherein the management device is further configured to communicate a hide-mouse-pointer command to said first one of said plurality of host computers when said user console pointer icon is moved outside said boundary of said first window when said first one of said plurality of host computers is activated.

* * * * *